United States Patent [19]

Kauffman et al.

[11] Patent Number: 5,080,944
[45] Date of Patent: Jan. 14, 1992

[54] HYBRID FLOOR COVERING

[75] Inventors: William J. Kauffman; George L. Lilley, both of Manheim; David E. Ruch, Lancaster, all of Pa.

[73] Assignee: Armstrong World Industries, Inc., Lancaster, Pa.

[21] Appl. No.: 304,645

[22] Filed: Feb. 1, 1989

[51] Int. Cl.⁵ .......... B32B 3/14; B32B 3/10; D06N 1/00; E04F 15/16
[52] U.S. Cl. .......... 428/47; 428/44; 428/136; 428/138; 428/155; 428/218; 428/251; 428/252; 156/163; 156/84; 156/229; 264/210.8; 264/209.5; 52/384
[58] Field of Search .......... 428/44, 136, 138, 155, 428/218, 251, 252, 47; 156/163, 84, 229; 264/210.8, 209.5; 52/384

[56] References Cited

U.S. PATENT DOCUMENTS

| | | | |
|---|---|---|---|
| 2,440,039 | 4/1948 | Brown | 428/155 X |
| 2,556,071 | 6/1951 | Denton | 428/138 X |
| 2,800,423 | 7/1957 | DeSwart | 154/43 |
| 3,297,461 | 1/1967 | Siddall | 117/4 |
| 3,769,120 | 10/1973 | Chandler | 156/84 |
| 3,821,059 | 6/1974 | Hensel | 161/36 |
| 3,990,929 | 11/1976 | Evans | 156/71 |
| 4,135,675 | 1/1979 | Greiner, Jr. et al. | 242/67.1 R |
| 4,159,219 | 6/1979 | Evans | 156/71 |
| 4,311,542 | 1/1982 | Mueller et al. | 428/201 X |
| 4,618,530 | 10/1986 | Stetson | 428/236 |
| 4,654,244 | 3/1987 | Eckert et al. | 428/47 |

Primary Examiner—Patrick J. Ryan
Assistant Examiner—William P. Watkins, III

[57] ABSTRACT

A vinyl floor covering to accommodate wood subfloor contraction and expansion as well as rolling load incorporates a foamed plastisol encapsulated glass mat which may be cut to form pivot points and expanded under a controlled pre-stressed condition. The glass mat serves as a carrier during maufacture and an "elastic glass" reinforcing layer during use as either tension or loose-lay flooring. The floor covering may be a true hybrid surface covering which is capable of accommodating the dimensional change of a target subfloor by utilizing the characteristics of both tension floorings and loose-lay floorings.

22 Claims, 5 Drawing Sheets

HYBRID FLOOR COVERING

Field of the Invention

The invention relates to floor coverings. In particular, the invention is directed to a flooring for loose-lay or tension floor installation and a hybrid floor covering which utilizes the characteristics of both loose-lay and tension floorings. The preferred floorings are vinyl surface coverings having an encapsulated non-woven fiber reinforcing layer.

BACKGROUND OF THE INVENTION

A considerable body of knowledge has developed on vinyl flooring materials and reinforcement materials for such flooring. Reinforcing layers, and more commonly, glass reinforcing layers, have received increasing attention in recent years for the construction of surface coverings. Floor coverings, in particular, have employed glass reinforcing layers, although the majority of the products which have contained such reinforcing layers have been developed in Europe. The reason for this appears to be that European dwellings are constructed primarily on concrete slabs which are dimensionally stable. In the United States, however, substantially different methods of construction are used in which most structures contain suspended wooden subfloors, including plywood and particleboard. Although structures of this type are less expensive than those containing concrete subflooring, suspended wooden subfloor is less stable than concrete when subjected to humid summer/dry winter seasonal changes.

Over the years, two systems have been developed for surface coverings which have come to be identified as self-induced tension floorings and loose-lay floorings. The present invention provides a new and useful surface covering which is capable of use either as a loose-lay surface covering or a tension surface covering. Because of its excellent accommodation, this surface covering can even be used over unstable substructures such as suspended wooden subfloors. A true hybrid surface covering is also disclosed which uses the characteristics of both loose-lay and tension flooring to permit use over suspended wooden subfloors.

Swart U.S. Pat. No. 2,800,423 entitled "Molded Article of Stretchable Glass Cloth" provided a concept of patterned cuts in a plastic sheet or glass cloth so that the sheet or cloth can be stretched and adapted for fitting compound curves without any need for cutting special patterns. There is no suggestion in Swart of placing the cloth in a pre-stressed condition or any advantage to use such a glass cloth over a substantially planar surface as the floors and other flat surfaces of the present invention.

Siddall U.S. Pat. No. 3,297,461 entitled "Reinforced Plastic Sheeting" disclosed how segmented inextensible filaments such as glass fibers encapsulated in polyvinyl chloride (PVC) can produce sheets capable of being stretched or compressed a small amount in any direction and any one portion of the sheet can be stretched or compressed without affecting any other portion so that the sheet could be used as flashing on a roof. Siddall teaches use of annealed metal filaments so that when deformed thay have no memory which tends to make them return to their original shape.

Evans U.S. Pat. No. 3,990,929, which is incorporated by reference, teaches methods of manufacturing and installing self-induced tension flooring or surface covering by manufacturing the structure on a thermally dimensionally stable backing. The backing not only serves as a carrier on which the flooring is manufactured but the backing also remains with the surface covering and is removed just prior to installation at the job site. The surface covering is secured at its perimeter only before the stresses therein are relieved.

Evans U.S. Pat. No. 4,159,219 teaches a method to produce an unbacked tension flooring by the specific design of two or more thermoplastic layers constructed such that when rolled, the outward facing layer elongates and the inward facing layer is compressed. Upon unrolling and placing flat, the elongated layer overcomes the compressed layer and thus a length greater than the original length before roll-up is generated. This elongation is defined herein as "roll-up growth". On securing the surface covering only at its periphery shortly after unrolling, the tendency of the surface covering to return to its original dimension, i.e. its elastic memory, creates a self-induced tension therein.

Greiner, Jr. et. al. U.S. Pat. No. 4,135,675 shows a paper carrier stripping method and apparatus which prevents uncontrolled tension from the necessary procedure of removing a strippable carrier from the structure before placing into a roll upon a windup stand.

Installation of these elongated tension floors by attachment at their periphery has produced one of the most reliable installation methods to accommodate fluctuating dimensional changes of unstable wood subfloors in today's environment. However, such tension floors are deficient in that the tension required to elongate the surface covering sufficiently to accommodate the dimensional change of wooden subfloors may be excessive. Further, the elongation of the surface covering is only in one direction.

Eckert et. al. U.S. Pat. No. 4,654,244 entitled "Loose-Lay and Adhered Surface Coverings" teaches the in-situ modification of reinforcing layers to form a surface covering capable of accommodating the movement of very unstable subfloors such as particle-board. One requirement of loose-lay flooring is that it must lay flat upon the subfloor and not curl or dome after installation. These loose-laid structures were balanced to provide lay-flat in-service characteristics.

A surface covering is balanced when the reinforcing layer is at the approximate neutral bending plane. The neutral bending plane is an imaginary plane within the surface covering above which the material is under tension and below which the material is under compression when the ends of the surface covering are subjected to a downward bending force.

Hensel U.S. Pat. No. 3,821,059 discloses another loose-lay surface covering. The reinforcing layer has a plurality of rigid elements separated by a resilient and compliant matrix.

But in spite of what was known, product and process deficiencies existed and improved performance was desirable in terms of rolling load resistance and cut or puncture expansion. In loose-lay floors, the reinforcing layer dominated the surface covering such that the flooring could not adjust to subfloor movement, resulting in buckling and other deformations. A need existed to eliminate the need for a strippable carrier and special apparatus to control pre-stressing of a self-induced tension product.

Prior to the present invention, it was not known that a flooring material could serve both loose-lay and tension floor applications. It was believed that for a tension floor to perform successfully the elongated length of the surface covering when installed must be greater than its relaxed length by at least as much as the subfloor on which it is installed may shrink due to environmental changes such as humid summer to dry winter seasonal changes. However, the magnitude of such a change in surface covering length would be unacceptable in a loose-lay floor since such shrinkage would pull the loose-lay surface covering noticeably away from the walls.

SUMMARY OF THE INVENTION

In one embodiment, the invention provides a surface covering product capable of use either as a loose-lay surface covering or a tension surface covering over wooden subfloors comprising a reinforcing layer having regions of differential relaxed compressive/ tensile stiffness, said regions being formed by a pattern of line segments in said layer, said pattern comprising a plurality of substantially parallel and linearly spaced first line segments and a plurality of substantially parallel and linearly spaced second line segments, said first and second line segments being nonintersectiong and interacting so as to form pivot points, said pivot points cooperating such that the surface covering product is elongated in a direction generally transverse to an applied tensile stretching force, the surface covering product being under a controlled pre-stressed condition whereby the surface covering product tends to return to its original pre-elongated dimension.

In another embodiment, the invention provides a surface covering product capable of use either as a loose-lay surface covering or a tension surface covering over wooden subfloors comprising a reinforcing layer having a plurality of slits, said layer being under a controlled pre-stressed condition whereby the adjacent sides of the slits are pulled apart.

Figure 1:
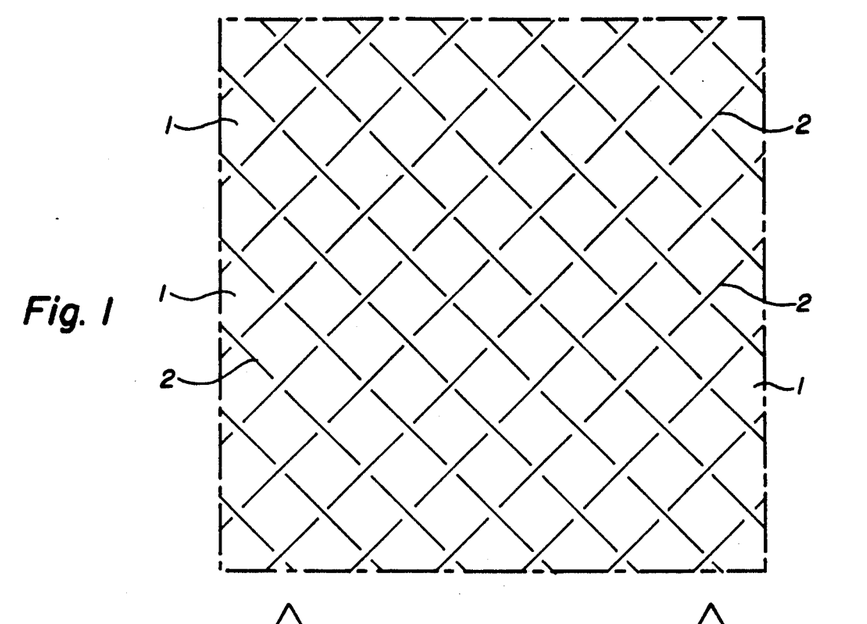
FIG. 1 is a plan view of a reinforcing layer perforated with a diagonal pattern.
Figure 2:
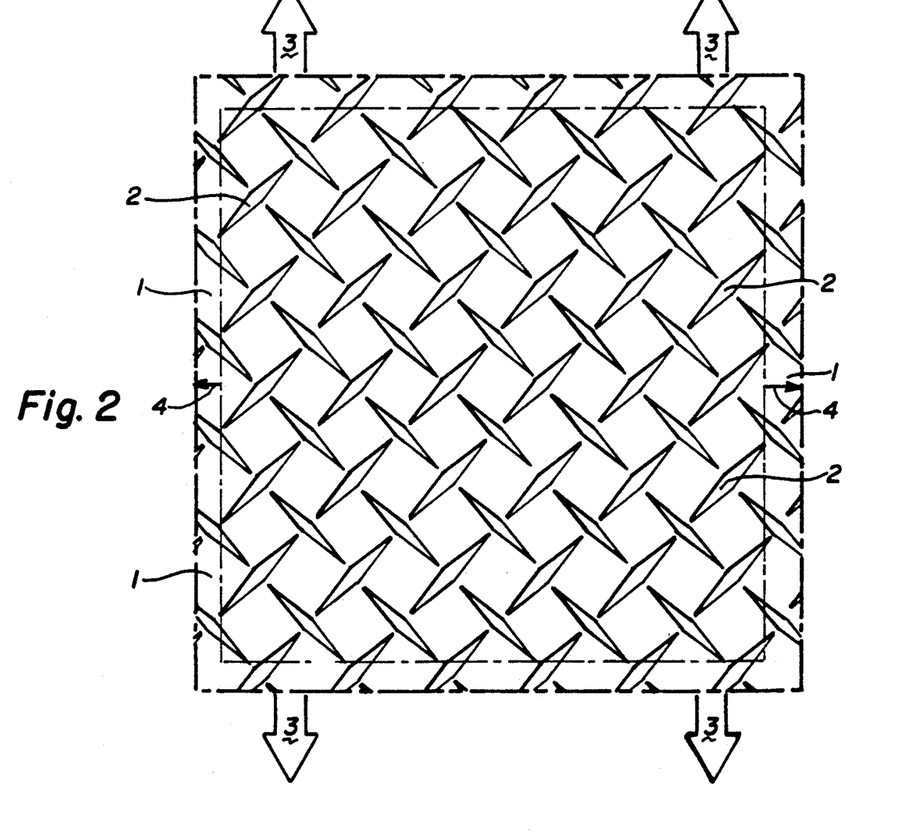
FIG. 2 is a plan view of the reinforcing layer of FIG. 1 expanded in two directions when stretched in one direction.

The preferred surface covering has a reinforcing layer which is an expandable diagonal pattern glass mat as illustrated in FIG. 1 and FIG. 2 in which the glass mat is encapsulated with a plastisol. Because of the controlled pre-stressed condition of the reinforcing layer, the adjacent sides of the slits are pulled apart. The slits interact to form pivot points, which cooperate such that the reinforcing layer is capable of increasing in dimension and decreasing in dimension, respectively, in a direction generally transverse to an applied tensile or compression force.

The reinforcing layer is preferably a non-woven mat such as a non-woven fiberglass which is encapsulated in plastisol. However, other materials including felt can be transformed into "elastic glass" as described herein.

An improved process for preparing surface coverings is provided in which regions of differential relaxed compressive/tensile stiffness is formed in a reinforcing layer of the surface covering, and the surface covering is placed in a controlled pre-stressed condition whereby the surface covering product is elongated and tends to return to its original pre-elongated dimension. A process for preparing a hybrid surface covering is also disclosed.

DETAILED DESCRIPTION OF THE INVENTION

An important concept for understanding the invention is the transformation of a reinforcing layer such as a glass mat carrier for a fusable vinyl composition into an internal elastic reinforcement. As part of the manufacturing process, the glass mat or equivalent thereof may be impregnated with foamable plastisol, diagonally slit and cooled while under tension to convert it into "elastic glass". This "elastic glass" functions as if it were a network of miniature bedsprings which can absorb stretching and compressions applied to the flooring in which the reinforcing layer is incorporated.

The term "hybrid" is meant to indicate that the surface covering uses the characteristics of both tension and loose-lay flooring to accommodate subfloor dimensional change.

Other terminology pertinent to the present invention is defined below to provide clarity in the description.

As used herein "surface covering" is a relatively thin element designed to be laid over a flat structure such as a flooring substructure or subfloor.

As used herein, "accommodation" is a built-in property for a surface covering to alter its size and shape to match an unstable subfloor or resist surface stress.

As used herein, "tension flooring" is a surface covering installed by anchoring at the periphery only such as by adhesive or staples which tends to shrink and return to its pre-elongated length thereby remaining taut and flat throughout a fluctuating environment.

As used herein, "loose-lay flooring" is a surface covering which will lie flat on a stable or unstable subfloor, which will resist doming, curling, buckling, or movement under a rolling load, and which need not be held in place using adhesives or fasteners.

As used herein, "critical buckle strain" is the strain at which a loose-lay floor that is compressed in a planar fashion will buckle.

As used herein, "subfloor dimensional change" is a measure of the change in length of a subfloor or other subsurface material under the conditions of its environment. This change is expressed herein in change per unit length.

Unstable subfloors such as particleboard dramatically increase the requirements for a surface covering because such subfloors tend to expand and contract depending on the temperature and relative humidity conditions within the structure in which the subfloor resides. During winter months, dry furnace-heated air tends to shrink unstable subfloors, whereas during humid summer months such subfloors tend to expand. A loose-lay floor structure that is laid over such a subsurface at its maximum expanded position and is pinned, attached or otherwise restricted by heavy objects such as appliances experiences a variety of stresses when the subfloor changes its dimensions. A loose-lay flooring structure constructed according to the prior art and having the required structural stability is often unable to accommodate these stresses, thus leading to doming, buckling or curling of the flooring.

It has become apparent that there are an infinite number of variables which affect the dimensional stability of commercial thermoplastic vinyl resin-containing docorative sheet floor coverings, especially those provided with porous backings which act to retain stresses built into the thermoplastic wear layer. A partial list of variables which affect stresses in the porous-backed thermoplastic wear layer includes the physical stresses imparted during production of the original backing utilized on such flooring the application of key coats to the felt or other porous backing, changes in speed, tension, and temperatures in the production of the thermoplastic vinyl resin-containing decorative wear layers and their consolidation onto the backing, the rolling and rerolling of the finished goods and the time, temperature, and humidity conditions at which the finished rolls are stored.

A wide variety of natural and synthetic reinforcing materials may be used to practice the present invention. Many glass, polyimide or composite reinforcing materials are commercially available and can be used in the construction of a variety of surface coverings. Typically, these materials are non-woven glass layers which comprise a substantially uniformly applied binder in order to provide structural integrity. Because these mats are non-woven, they usually have a substantially uniform strength in all directions. The weights of glass materials ordinarily vary from about 10 to about 150 grams per square meter, although lighter or heavier materials may be encountered on occasion. Materials such as polyester, polyamide and other synthetic fibrous materials may be used alone or in combination with glass or each other to provide reinforcing materials.

Because the process of the invention uses the non-woven mat as a carrier for oven fused compositions, the mat must have sufficient hot tensile strength to survive oven heating. It is preferred to employ a mat with a hot tensile strength greater than 2 pounds per inch of width (ppiw) as measured on an Instron ® testing apparatus. For instance, a non-woven glass fiber mat with a weight of 1.54 oz/sq. yd. can provide a tensile strength of 10 ppiw at 350° F.

The object of the present invention is to provide the reinforcing material with regions of differential relaxed compressive/tensile stiffness by chemically or physically weakening or interrupting the material and introducing a controlled pre-stressed tension into the reinforcing material during manufacture so that the reinforcing layer retains the controlled pre-stressed tension after manufacture even when the surface covering product is not subjected to an external tensioning force. The pre-stressed tension allows the reinforcing layer to compress when subjected to an external compression force while maintaining a high critical buckle strain as discussed in U.S. Pat. No. 4,654,244 which is incorporated herein by reference.

Since the modified reinforcing layer permits compression, the increase in dimension introduced by rolling up the surface covering need not be as great as typical tension surface coverings and still be capable of performing as a tension surface covering. If the surface covering of the present invention is installed as a tension floor covering when the subflooring is at its greatest expansion, shrinkage of the subflooring will be accommodated first by the increased dimension of the surface covering which itself tends to shrink and then by compression of the surface covering.

Since the increased dimension of the present surface covering is not as great as typical tension coverings, it can also be used as a loose-lay covering without pulling away from the walls excessively. In fact, it is advantageous for a loose-lay surface covering to shrink a small amount after installation so that the covering can be cut to fit the room accurately and then ensuring enough shrinkage so that the edges do not curl or buckle due to tight fitting from being cut too full during installation.

Another object is to provide a reinforcing material with a pattern of weakening or interruption whereby the width of the material will tend to expand in a direction transverse to an applied tensile force. That is, flooring reinforced with "elastic glass" is capable of increasing or decreasing in dimension in a direction perpendicular to an applied force. The flooring shows excellent accommodation characteristics over unstable subsurfaces or in response to surface distortions or cuts or punctures.

We have discovered that tension flooring structures containing a glass mat reinforcing layer disposed within a foam layer can be designed which use a combination of critical buckle strain and roll-up growth to yield a dimensional change greater than the maximum subfloor dimensional change. This type of surface covering is defined as a hybrid surface covering.

The reinforcing layer can be modified in situ such that the modified structure will have a critical buckle strain which is less than the subfloor maximum dimensional change. The roll-up growth obtained by rolling up the modified structure is less than the subfloor maximum dimensional change. Therefore, a portion of the roll-up growth is retained by securing the structure at the periphery only around the subfloor such that a self-induced tension is created, but it is insufficient to maintain the floor taut when installed over the subfloor at its maximum length and the subfloor is caused to shrink by environmental conditions by its maximum dimensional change. However, the combination of self-induced tension and critical buckle strain is sufficient to maintain the floor flat even when self-induced roll-up tension is lost and subfloor movement causes the structure to be compressed. The in situ modification may be a chemical modification of the reinforcing layer binder such as described in Example 4.

The hybrid surface coverings may be balanced. However, the preferred hybrid surface coverings are unbalanced. By having the reinforcing layer below the neutral bending plane, roll-up growth is promoted.

In spite of all that had been previously developed for tension flooring and loose-lay flooring and what was known of reinforcing layers, problems and limitations still existed for which no apparent solutions had been devised. Cuts or punctures in installed tension flooring would be enlarged into large gaps by the built-in shrinkage meant to keep the flooring taut. Therefore, a flooring would have to be replaced due to original small cuts or punctures which would not be objectionable or could be mended or repaired if they did not spread.

Shrinkage of wood subfloors create a compressive strain which would crack prior flooring structures.

As a means of advancing the state of the art, it has been discovered that non-woven mats can be plastisol encapsulated and used for the dual purposes of a carrier layer for vinyl flooring manufacturing and as an accommodation medium. The figures help to illustrate how these advantages are accomplished.

DETAILED DESCRIPTION OF THE DRAWINGS

FIG. 1 shows a plastisol impregnated non-woven network or mat 1 which has perforations 2 in a diagonal pattern. As seen in FIG. 2, when tension 3 is applied to the mat 1 in the machine direction or MD, it expands transversely as showed at 4 in the across machine direction or AMD. As the mat in FIG. 2 expands laterally from the unstressed condition of FIG. 1, the perforations 2 are widened.

Figure 3:
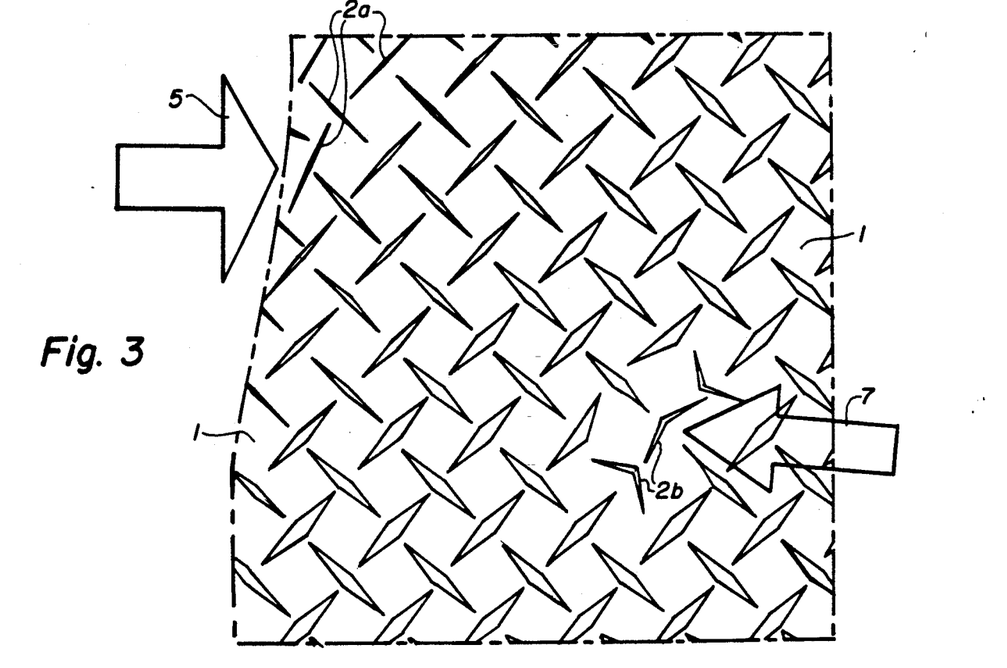
FIG. 3 is a plan view of a stressed "elastic glass" reinforcing layer.

The mat 1 in FIG. 3 is shown subjected to a static compressive force 5 such as a shrunken subfloor which has locally compressed the mat and decreased the size of the perforations 2a. Also, a moving surface force 7 causes deformation of perforations 2b and this illustrates how the mat of the invention functions as "elastic glass38 to maintain integrity under static and dynamic compressive and expansive forces.

Figure 4:
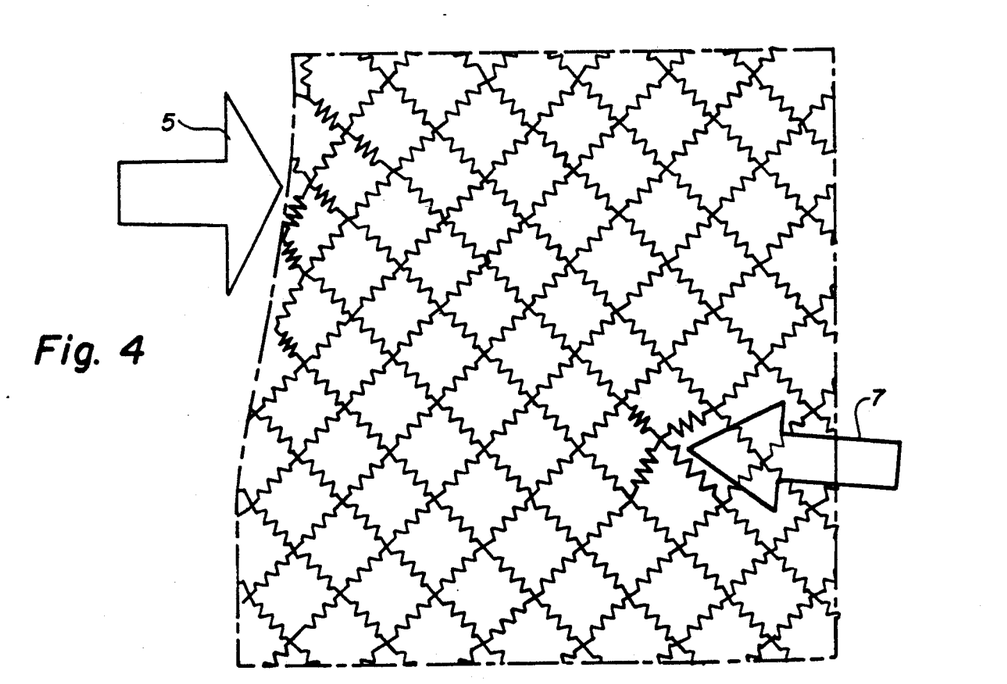
FIG. 4 is an analogous bedspring stress response.

The effect of the elastic glass is shown in FIG. 4 by a bedspring analog where the compressive force 5 has compressed the spring spacing and the traveling force 7 causes localized deformation until returning to the normal balanced spacing when not subject to external pressure.

A flooring structure of the present invention has a reinforcing layer having regions of differential relaxed compressive/tensile stiffness such as shown in FIGS. 1 to 3. The regions are formed by a pattern of line segment physical disruptions in the layer. The pattern is a plurality of parallel and linearly spaced first line segments and a plurality of parallel and linearly spaced second line segments. The first and second line segments are nonintersecting and preferably substantially perpendicular to one another. They interact so as to form pivot points which cooperate so that the layer is capable of increasing in dimension or decreasing in dimension, respectively, in a direction generally transverse to an applied tensile or compressive force. Although substantially square areas are illustrated in the figures, it is not necessary that square areas be employed. For example, suitable reinforcing materials with regions of differential relaxed compressive/tensile stiffness may be prepared having other geometric patterns, the sole requirement being that the structures be provided with pivot points such that the width of the layer will expand in a direction substantially transverse to an applied tensile force.

The type and orientation of the pattern may depend on the manner in which is it produced. If a flat-bed press is used to create the disruption pattern, orientation is not a major consideration. However, a flat-bed press is inherently slow because the web must be stopped during the compression phase, and pattern registration problems can also be encountered. For these reasons, it is preferred to use a rotary tool to provide the pattern. The web may be passed continuously through a rotary tool, thereby speeding up the process and avoiding registration difficulties. Nevertheless, pattern orientation becomes a much more important consideration when using a rotary tool.

If the pattern is oriented as illustrated in the figures, the web is always in contact with a fairly uniform pattern cross section; i.e. it continuously "sees" essentially the same pattern as the tool turns. However, if the pattern is rotated 45 degrees, the first line segment would be oriented in the machine direction whereas the second line segments would be oriented in the across machine direction. In that situation, the web would not see a uniform pattern. Instead it would be contacted sequentially with a pattern cross section comprising the AMD pattern alternating with the MD pattern, and then with a pattern cross section comprising only the MD pattern. In a manufacturing environment where large rotary tools many feet in length are used at high rotation speed, this orientation would cause the rotary tool to develop an oscillation or "bounce". Thus, where such tools are utilized, it is preferred to orient the pattern so that the web is contacted as uniformly as possible by the rotating tool.

Figure 5A:
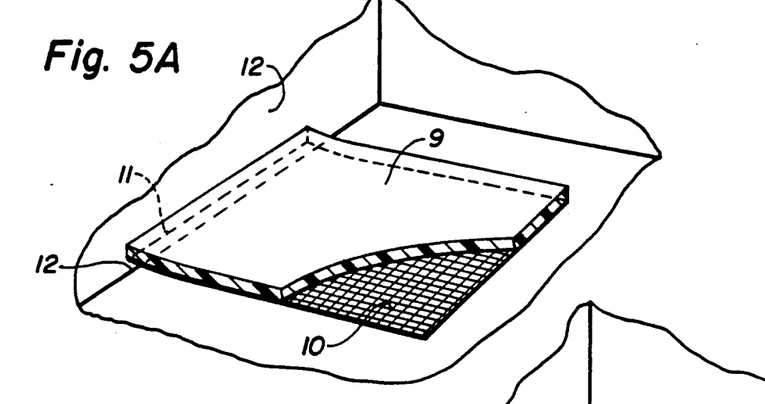
FIGS. 5A and 5B are perspective views comparing the loose-lay surface covering of the prior art with the surface covering of the present invention.

A prior art loose-lay flooring 9 is shown in FIG. 5A. The rigid glass reinforcement mat 10 has curled up at 11 by being cut too close to the wall 12 to allow for normal contraction of the subflooring.

Figure 5B:
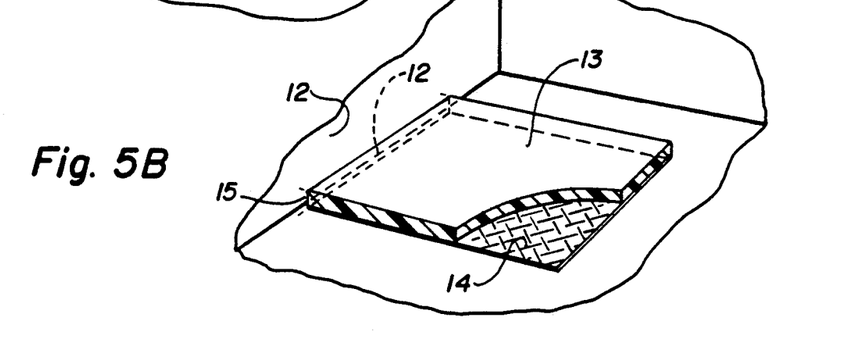

In FIG. 5B, the loose-lay flooring of the invention 13 with the "elastic glass" mat 14 has a small gap 15 between the edge of the flooring and the wall 12 due to the small degree of built-in contraction which is controlled from further movement by the balanced elastic properties of the mat 14.

Figure 6A:
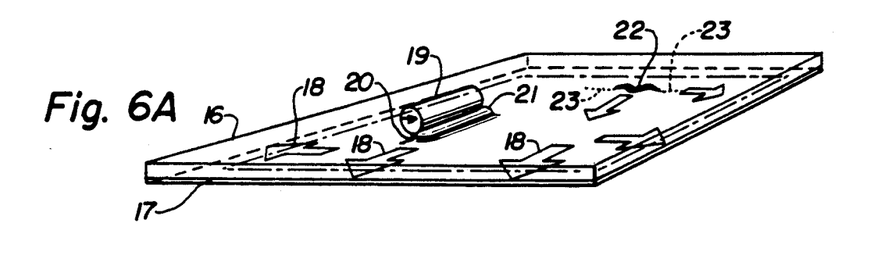
FIGS. 6A and 6B are perspective views comparing the tension surface covering of the prior art with the surface covering of the present invention.

A prior art tension flooring 16 is shown in FIG. 6A attached around the periphery 17 such that permanent built-in tension forces 18 make the whole surface taut like a drumhead. A rolling force 19 combined with the tension force 18 cause a tear 20 behind the disturbed vinyl 21. A cut 22 is split open at 23 by the tension forces 18.

Figure 6B:
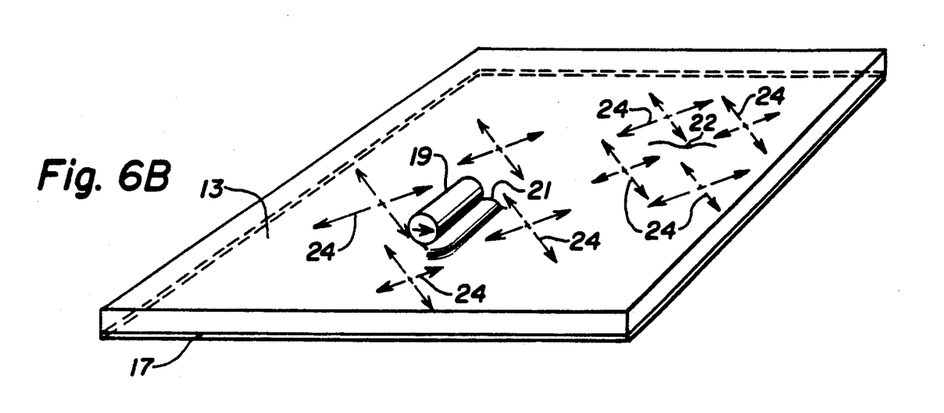

The flooring of the invention 13, shown in FIG. 6B attached around the periphery, responds to the rolling force 19 by distorting the vinyl 21 with built in elastic reinforcing forces 24 which absorb force and maintain integrity. Further a cut 22 is not split open due to the forces 24.

Figure 7:
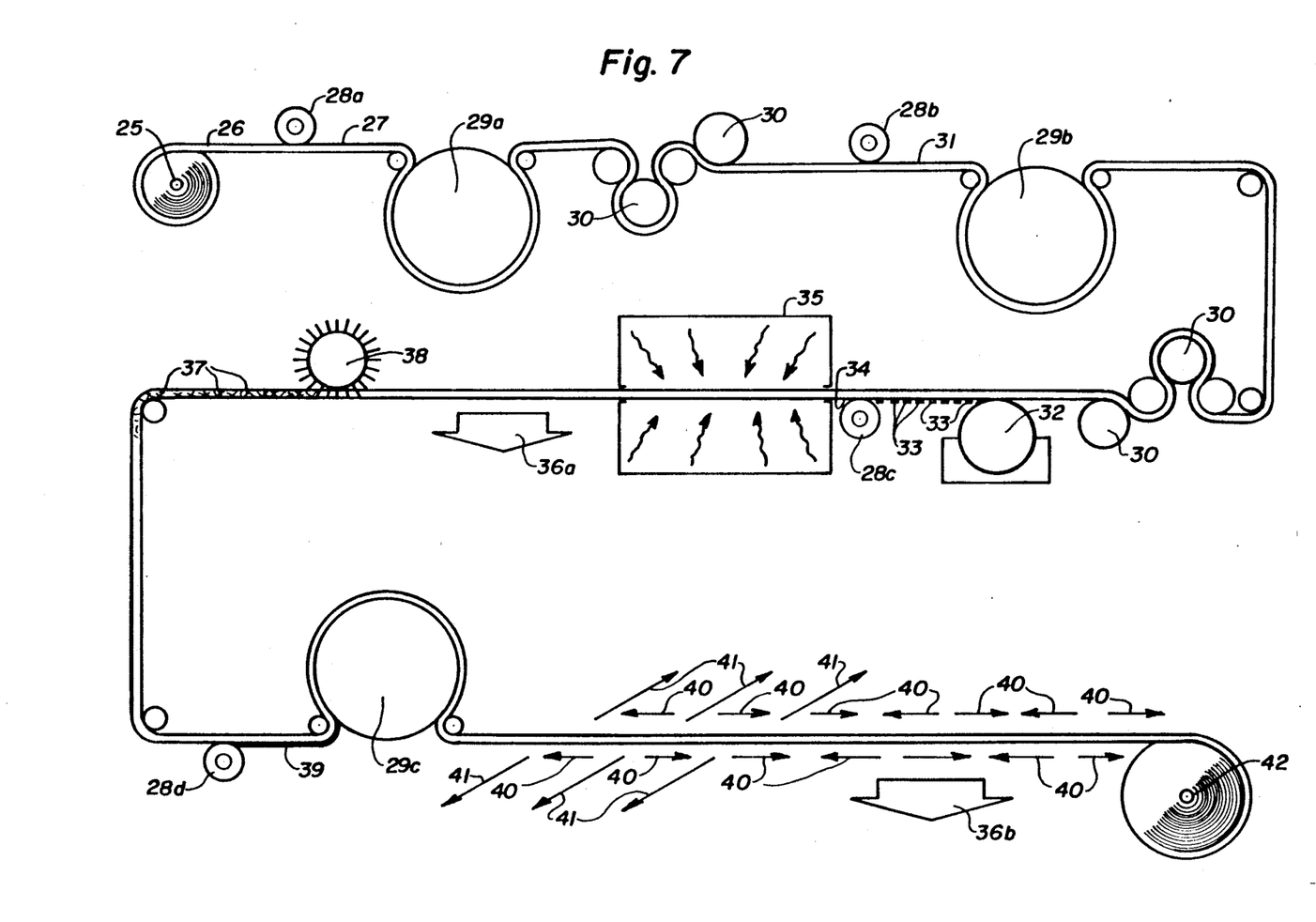
FIG. 7 is a schematic representation of the equipment for performing the manufacturing process of the present invention.

The manufacturing process is illustrated in FIG. 7. A nonwoven glass mat 26 is unwound from unwind roll 25 and is impregnated with a liquid plastisol 27 under a coating roll 28a. A heating drum 29a solidifies the plastisol and the web then passes through smoothing rolls 30. A second plastisol 31 is applied by a coating roll 28b followed by heating drum 29b and smoothing rolls 30. A decorating roll 32 applies a pattern 33 followed by a clear plastisol 34 applied by coating roll 28c. The composition is heated in an oven 35 to fuse the clear vinyl layer over the decorated pattern. The composition is then cooled at 36a and the underside with the encapsulated glass mat is then perforated as shown at 37 by a perforating roll 38. The perforated mat is coated with plastisol 39 by coating roll 28d. After passing around heating drum 29c, the heated composition is subjected to a tension force 40 in the machine direction which results in an across machine direction or transverse stretching 41 and a controlled pre-stressed tension. The composition is cooled at 36b while under tension and is wound on the roll 42.

The plastisol may be applied by any convenient coating technique such as dip, skim, bar, airknife, curtain.

Reverse roll coating with knife thickness regulation is a preferred technique.

The foamable plastisols may vary from a 2 to 1 to a 4 to 1 blow ratio. It is preferred that the plastisol which encapsulates the mat have a 2 to 1 ratio and the plastisol coating which is decorated have a 3 to 1 ratio. The clear protective vinyl coating can range from 4 to 30 mils thickness.

A test suitable for determining the suitability of a mat material employs an Instron Tensile Tester equipped with a heating chamber. Test samples are cut 1" by 6" (cut 6" in the machine direction). The test is conducted at 350° F. with a 4" distance between the jaws. Machine speed for testing is 4" per minute with a chart speed of 5" per minute. The results obtained are maximum pounds of pull per one inch width to break the sample apart. For the purposes of the invention results of 1 (one) pound per inch of width or greater are required. It is preferred that a value of 2 or greater be obtained.

EXAMPLE 1

The preferred process of the present invention where a glass mat is modified in situ using a pattern of diagonal cuts within the reinforcement is illustrated. The modified structure is then heated and pulled apart from 0.1% minimum to 10% maximum in the machine direction which causes transverse (across machine direction) expansion also. The stretched or pre-stressed structure is cooled and fed to a wind up stand where the pre-stressed structure is placed into a roll.

A non-woven glass mat FG7155 available from Manville Corporation was utilized as a carrier to prepare the structure. The mat had a hot tensile strength in excess of five pounds per inch of width when tested at 350° F.

Four plastisol compositions were prepared having the formulations listed below. The molecular weights of the resins are determinable from the specific viscosities (in parentheses) which were measured according to ASTM D-1243.

| Ingredient | Parts by Weight |
| --- | --- |
| Plastisol A | |
| PVC homopolymer resin, dispersion grade (0.38) | 66 |
| PVC homopolymer resin, extender grade (0.35) | 34 |
| Monomeric plasticizer | 62 |
| Azobisdicarbonamide blowing agent | 0.8 |
| Blowing agent activator | 0.6 |
| Stabilizer | 0.7 |
| Limestone filler | 50 |
| Plastisol B | |
| PVC homopolymer resin, dispersion grade (0.38) | 66 |
| PVC homopolymer resin, extender grade (0.35) | 34 |
| Monomeric plasticizer | 62 |
| Azobisdicarbonamide blowing agent | 1.5 |
| Blowing agent activator | 0.6 |
| Stabilizer | 0.7 |
| Limestone filler | 50 |
| Plastisol C | |
| PVC homopolymer resin, dispersion grade (0.60) | 30 |
| PVC homopolymer resin, dispersion grade (0.42) | 70 |
| Monomeric plasticizer | 45 |
| Viscosity diluent | 5 |
| Stabilizer | 1 |
| Plastisol D | |
| PVC homopolymer resin, dispersion grade (0.58) | 60 |
| PVC homopolymer resin, extender grade (0.35) | 40 |
| Monomeric plasticizer | 62 |
| Stabilizer | 1.5 |
| Pigment | 3 |
| Limestone filler | 50 |

The mat was passed through a reverse roll coater where foamable plastisol A was applied into the upper porous surface of the mat. The wet coated side of the sheet was passed around a heated drum (280° F.) to gel the plastisol. A 0.021 inch thick sheet weighing 460 grams per square yard was produced. The heated sheet was passed around cooling cans to cool the structure sufficient to apply a second coating. After cooling, the structure was passed through a reverse roll coater where a 0.006 inch thick coating of foamable plastisol B was applied to the smooth drum finished surface of the sheet. This second wet coating was gelled by passing around a heated drum with a 280° F. drum temperature. The heated sheet exiting the drum was passed around cooling cans to cool the structure sufficient to apply a rotogravure decorative print.

The smooth drum finished surface was then printed by conventional rotogravure printing utilizing solvent inks. Benzotriazole inhibitor was added to one of the inks to produce embossing by traditional chemical means of blowing agent inhibition. The decorated sheet was fed through a reverse roll coater where a clear protective coating of plastisol C was applied over the decorated sheet surface to produce a 0.010 inch thick clear layer on the surface. The structure was passed through an oven at about 380° F. to fuse the 0.010 inch thick wear layer, expand the upper foamable plastisol layer to 0.015 inches in areas not printed with inhibitor, and expand the bottom foam and glass layer to 0.028 inches of thickness.

The structure was cooled to a temperature below 100° F. and fed through a set of pinch rolls where the upper roll was an embossing roll and the backing roll was a smooth steel roll. The structure was fed upside down through the pinch nip such that the decorative clear coated surface was against the smooth steel roll and the glass mat and foam surface was against the embossing roll. Sufficient pressure was supplied to the pinch nip to emboss into and perforate the glass mat producing the pattern shown in FIG. 1.

The modified structure was passed through a reverse roll coater to apply 0.012 inches of plastisol D to the back foam side of the structure. The wet coating was fused by passing around a heated drum, 310° F. drum temperature, for about 20 to 25 seconds. After removing the structure from the hot drum surface tension was applied to the heated sheet by cooling cans following the drum sufficient to open the perforations within the glass mat causing expansion transverse to the applied tension. The pre-stressed, expanded structure was fed to a windup stand and placed into a roll while applying tension.

The modified structure without pre-stressing was found to have a critical buckle strain of 0.001 which means that the structure would start to buckle when laid loose and compressed in planar fashion 0.1%. Pre-stressing or stretching will add directly to the critical buckle strain when material is removed from the above roll and attached at its periphery. The pre-stressed or expanded flooring must shrink to return the flooring to its unstressed state before the flooring begins to be compressed. In theory, 0.1% to 10% pre-stressing would be added to the 0.1% compressive ability to predict in plane movement potential of 0.2% minimum to 10.1% maximum, however, some loss of expansion would be expected in long term storage of the roll.

EXAMPLE 2

Figure 8:
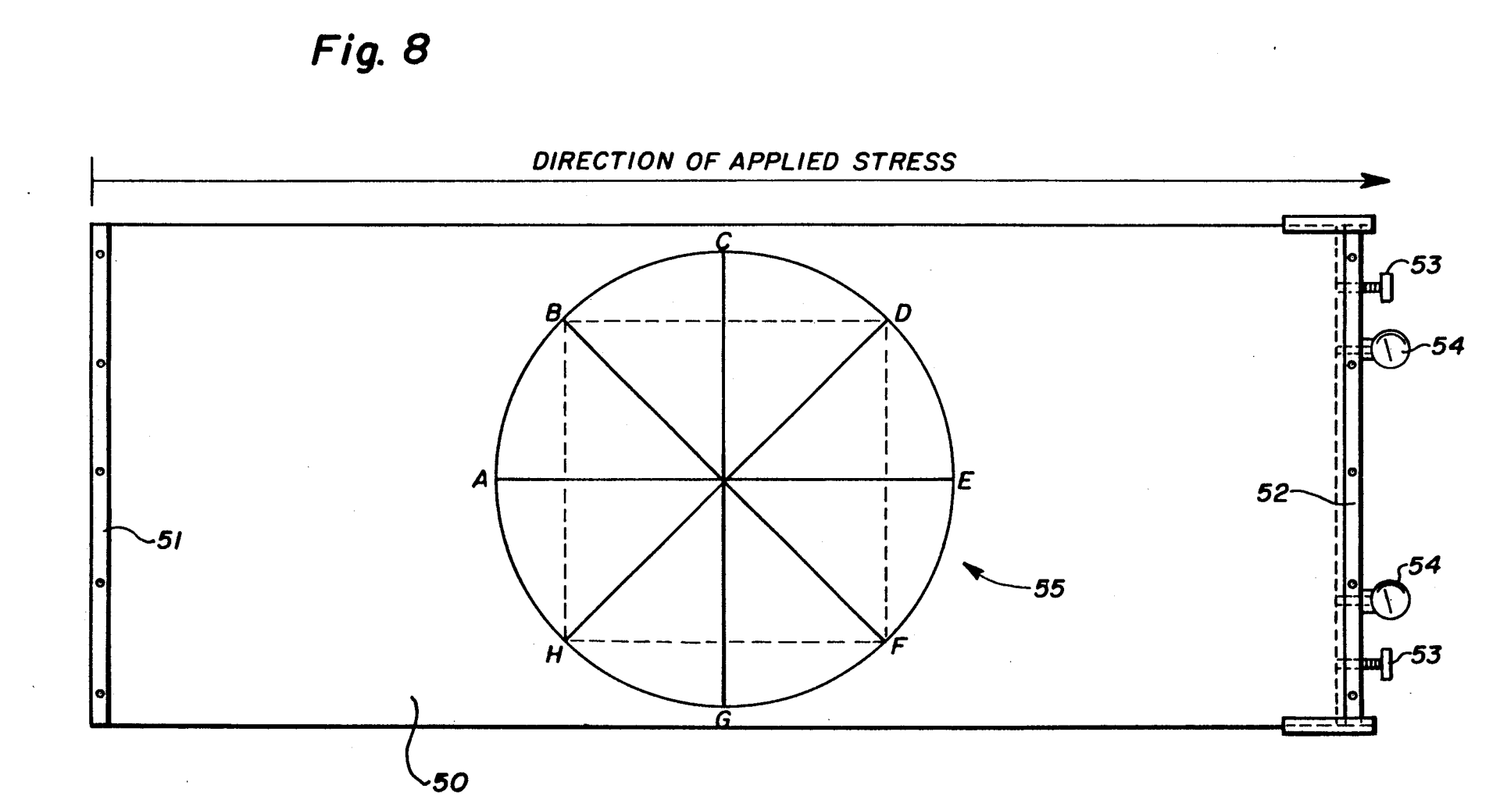
FIG. 8 is a plan view of apparatus used to test the flooring structure of the present invention.

A series of tests was run on various non-pre-stressed reinforcing layers and flooring structures using a test apparatus as illustrated in FIG. 8. In this figure, 50 is the bed on which the sample rests, 51 is a stationary clamping rail and 52 is a moveable clamping rail. To conduct the test, a sample was cut having approximately the width of the bed (about 19 inches) and having a length sufficient for the ends of the sample to be clamped by rails 51 and 52 (about 50 inches). In the examples which follow, samples were cut such that the long dimension (the direction of applied stress) was in the machine direction whereas the narrow dimension was in the across machine direction. A tensile stretching force was then applied by tightening turn screws 53 such that gauges 54 indicated that the sample had been elongated by about 0.4 inch. Sample I was an exception, however, since the mat was uncut, the sample was only elongated about 0.15 inch.

The test results were obtained through measurements made using benchmark diagram 55. In this diagram, line A-E coincides with the direction of the applied stretching force, lines B-F and D-H are at a 45-degree angle to the applied force, and line C-G is transverse to the applied force. Measurements were made by placing the sample on the bed in a clamped, but stress-free posture, transcribing diagram 55 onto the sample, measuring distances A-E, B-F, C-G and D-H of the circle and B-D, D-F, F-H and H-B of the square, applying stress to the sample by elongating it as described above, and determining the relative changes in length of each dimension. For conventional samples, distances B-H, C-G and D-F would be expected to diminish whereas samples prepared using the pattern of FIG. 1 were found to increase. These results may be seen from the following tables in which Samples I-V are identified as follows:

| Sample | Description |
|---|---|
| I | Manville FG 7155 glass mat, uncut, basis weight 55 g/m2 |
| II | Manville FG 7155 glass mat, cut in the pattern illustrated in FIG. 1. |
| III | Example 1, except non-pre-stressed and without a back coat |
| IV | Example 1, except non-pre-stressed |
| V | Example 1, except uncut mat, non-pre-stressed and without a back coat |

The following tables indicate the values which were obtained under ambient conditions before and after elongation. The right-hand columns of the tables indicate the changes which were observed. It is noted that only samples II, III, and IV in which the mats were cut showed increases in width for the C-G measurements and for the D-F and H-B measurements.

TABLE I

Measurements Using the Circular Portions of the Diagram

| SAMPLE | Initial Measurements (Inches) | | | | Measurements After Elongation (Inches) | | | | Change (Inches) | | | |
|---|---|---|---|---|---|---|---|---|---|---|---|---|
| | AE | BF | CG | HD | AE | BF | CG | HD | AE | BF | CG | HG |
| I | 18.49 | 18.49 | 18.48 | 18.47 | 18.55 | 18.50 | 18.44 | 18.50 | +0.06 | +0.01 | −0.04 | +0.03 |
| II | 14.97 | 14.93 | 14.95 | 14.95 | 15.12 | 15.05 | 15.09 | 15.11 | +0.15 | +0.12 | +0.14 | +0.16 |
| III | 17.98 | 17.98 | 18.01 | 18.01 | 18.12 | 18.06 | 18.05 | 18.08 | +0.14 | +0.08 | +0.04 | +0.07 |
| IV | 17.94 | 17.94 | 17.94 | 17.94 | 18.10 | 18.01 | 17.99 | 18.02 | +0.16 | +0.07 | +0.05 | +0.06 |
| V | 17.03 | 17.01 | 17.00 | 17.02 | 17.15 | 17.06 | 16.95 | 17.06 | +0.12 | +0.05 | −0.05 | +0.04 |

TABLE II

Measurements Using the Square Portions of the Diagram

| SAMPLE | Initial Measurements (Inches) | | | | Measurements After Elongation (Inches) | | | | Change (Inches) | | | |
|---|---|---|---|---|---|---|---|---|---|---|---|---|
| | BD | DF | FH | HB | BD | DF | FH | HB | BD | DF | FH | HB |
| I | 13.05 | 13.05 | 13.03 | 13.10 | 13.09 | 13.02 | 13.05 | 13.06 | +0.04 | −0.03 | +0.02 | −0.04 |
| II | 10.52 | 10.52 | 10.60 | 10.55 | 10.66 | 10.62 | 10.70 | 10.62 | +0.14 | +0.10 | +0.10 | +0.07 |
| III | 12.77 | 12.69 | 12.72 | 12.71 | 12.87 | 12.73 | 12.82 | 12.74 | +0.10 | +0.04 | +0.10 | +0.03 |
| IV | 12.63 | 12.70 | 12.66 | 12.68 | 12.76 | 12.74 | 12.77 | 12.70 | +0.13 | +0.04 | +0.11 | +0.02 |
| V | 12.74 | 12.73 | 12.76 | 12.72 | 12.83 | 12.70 | 12.85 | 12.68 | +0.09 | −0.03 | +0.09 | −0.04 |

EXAMPLE 3

While it is preferable to supply the external stretching force while the reinforcing layer is in a heated condition, such stretching force, if large enough, can be applied while the reinforcing layer is at ambient temperature with elongation of the surface covering product. A three inch by 13 inch portion of Sample III (Example 2) was placed in a tensionometer with a jaw separation of 11 inches. The sample portion was pulled to the indicated load, held for one minute and released. The change of a ten inch reference mark was then measured after various periods of time. The results are set forth in the table below:

| Load Lb/In. Width | Change in Length (Inches) | | | | |
|---|---|---|---|---|---|
| | 1 Min. | 10 Mins. | 1 Hr. | 4 Hrs. | 24 Hrs. |
| 2 | +.002 | +.001 | −.002 | −.002 | −.003 |
| 4 | +.004 | +.002 | 0 | −.002 | 0 |
| 6 | +.010 | +.005 | +.002 | +.002 | +.001 |
| 8 | +.013 | +.009 | +.006 | +.004 | +.003 |
| 10 | +.021 | +.016 | +.012 | +.010 | +.010 |
| 12 | +.037 | +.027 | +.023 | +.020 | +.021 |
| 15 | +.099 | +.077 | +.070 | +.066 | +.063 |

EXAMPLE 4

This example illustrates the use of reinforcing materials having a softenable binder whereby the character of the reinforcing material may be changed in situ.

A flooring structure for use over a unstable wooden subfloor may be made from a foamable polyvinyl chloride plastisol matrix material having the following composition.

| Ingredient | Parts by Weight |
| --- | --- |
| Dispersion Grade PVC Homopolymer Resin, MWt 105,000 | 36.00 |
| Dispersion Grade PVC Homopolymer Resin, MWt 80,400 | 36.00 |
| Blending Grade PVC Homopolymer Resin, MWt 81,100 | 28.00 |
| Epoxy-type plasticizer | 1.00 |
| Dioctyl phthalate | 50.00 |
| Blowing agent activator | 0.20 |
| Stabilizer | 0.15 |
| Azodicarbonamide blowing agent | 0.66 |
| Feldspar filler | 18.00 |
| Butyl benzyl phthalate plasticizer | 34.00 |

A layer of the plastisol was coated on a chrome steel plate at a thickness of 0.015 inch and one layer of SAF 50/2 reinforcing material obtained from Manville Corporation was placed in the wet plastisol. When the reinforcing material was saturated, the material was gelled at 400° F. for one minute and cooled. Thereafter, the reinforcing layer is incorporated into a flooring structure by means well known in the art. The reinforced material looses a portion of its tensile stiffness when placed in the vinyl matrix, apparently due to softening of the reinforcing material binder in the presence of the butyl benzyl phthalate plasticizer. This flooring structure may be placed in a controlled pre-stressed condition whereby the surface covering is elongated and tends to return to its original pre-elongated dimension and used as a hybrid surface covering.

What is claimed is:

1. A resilient floor covering comprising a reinforcing layer and a continuous layer of matrix material wherein said reinforcing layer is covered by said matrix material, the floor covering having been produced by modifying the reinforcing layer in situ by chemical or mechanical means to have a relaxed compressive stiffness and relaxed tensile stiffness such that the floor covering will elongate under tension and resist bending during compression, the floor covering before modification of said reinforcing layer having a critical buckle strain less than the subfloor dimensional change of a target subfloor, the floor covering after modification of said reinforcing layer having a critical buckle strain greater than the original critical buckle strain but less than the subfloor dimensional change of the target subfloor, the reinforcing layer being elongated in at least one direction, the elongation being less than the subfloor dimensional change of the target subfloor, the total of the critical buckle strain and elongation being greater than the subfloor dimensional change of the target subfloor whereby the floor covering is capable of accommodating the dimensional change of the target subfloor when the floor covering is secured to the target subfloor around the periphery only.

2. The floor covering according to claim 1 wherein the floor covering is unbalanced.

3. The floor covering according to claim 1 wherein the reinforcing layer is modified in situ to form a first region and a second region, the relaxed compressive stiffness and the relaxed tensile stiffness of the first region being different than the relaxed compressive stiffness and the relaxed tensile stiffness of the second region.

4. The floor covering according to claim 1 wherein the reinforcing layer is modified in situ whereby the relaxed compressive stiffness and the relaxed tensile stiffness of the reinforcing layer are substantially uniformly changed.

5. The floor covering according to claim 1 wherein the in situ modification is a chemical modification of the reinforcing layer.

6. The floor covering according to claim 5 wherein the reinforcing layer comprises a nonwoven fiber and binder encapsulating said fiber, said binder being chemically modified in situ.

7. The floor covering according to claim 1 wherein the in situ modification is a mechanical modification of the reinforcing layer.

8. The floor covering according to claim 7 wherein the reinforcing layer comprises a nonwoven fiber and the fibers are cut in situ.

9. The floor covering according to claim 1 wherein the reinforcing layer is elongated at least in part by an applied tensile stretching force.

10. The floor covering according to claim 1 wherein the reinforcing layer is elongated at least in part due to roll-up growth.

11. A method for making a floor covering having a reinforcing layer and a continuous layer of matrix material wherein said reinforcing layer is covered by said matrix material comprising:

(a) modifying the reinforcing layer of the floor covering in situ by chemical or mechanical means to have a relaxed compressive stiffness and relaxed tensile stiffness such that the floor covering will elongate under tension and resist bending during compression whereby the critical buckle strain of the floor covering after the modification is greater than the original critical buckle strain of the floor covering but less than the subfloor dimensional change of a target subfloor, and (b) elongating the reinforcing layer in at least one direction, the elongation being less than the subfloor dimensional change of the target subfloor, the total of the critical buckle strain and elongation being greater than the subfloor dimensional change of the target subfloor.

12. The method of claim 11 wherein the reinforcing layer is modified in situ to form a first region and a second region, the relaxed compressive stiffness and the relaxed tensile stiffness of the first region being different than the relaxed compressive stiffness and the relaxed tensile stiffness of the second region.

13. The method of claim 12 wherein the reinforcing layer comprises non-woven fiber and the fibers are cut in situ.

14. The method of claim 11 wherein the reinforcing layer is modified in situ whereby the relaxed compressive stiffness and the relaxed tensile stiffness of the reinforcing layer are substantially uniformly changed.

15. The method of claim 14 wherein the reinforcing layer comprises a non-woven fiber and binder encapsulating the fiber, and the binder is chemically modified in situ.

16. The method of claim 11 wherein the reinforcing layer is elongated at least in part by an applied tensile stretching force.

17. The method of claim 11 wherein the reinforcing layer is elongated at least in part by roll-up growth.

18. The floor covering according to claim 1 wherein the subfloor dimensional change of the target subfloor is about 0.003.

19. The floor covering according to claim 1 wherein the subfloor dimensional change of the target subfloor is about 0.0015.

20. The method of claim 11 wherein the subfloor dimensional change of the target subfloor is about 0.003.

21. The method of claim 11 wherein the subfloor dimensional change of the target subfloor is about 0.0015.

22. The floor covering according to claim 1 wherein the basis weight of the floor covering is from about 2 to about 10 pounds per square yard.

* * * * *